(12) United States Patent
Gaal et al.

(10) Patent No.: US 8,787,499 B2
(45) Date of Patent: Jul. 22, 2014

(54) CHANNEL ESTIMATION WITH EFFECTIVE CO-CHANNEL INTERFERENCE SUPPRESSION

(75) Inventors: Peter Gaal, San Diego, CA (US); Tao Luo, San Diego, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 569 days.

(21) Appl. No.: 12/055,745

(22) Filed: Mar. 26, 2008

(65) Prior Publication Data

US 2008/0240314 A1   Oct. 2, 2008

Related U.S. Application Data

(60) Provisional application No. 60/908,399, filed on Mar. 27, 2007.

(51) Int. Cl.
*H03K 9/00* (2006.01)
*H04L 27/00* (2006.01)
*H04L 27/26* (2006.01)
*H04L 25/02* (2006.01)
*H04J 11/00* (2006.01)

(52) U.S. Cl.
CPC ........ *H04L 27/2647* (2013.01); *H04L 25/0226* (2013.01); *H04J 11/0056* (2013.01); *H04L 25/022* (2013.01)
USPC ............ 375/316; 375/238; 375/239; 375/353

(58) Field of Classification Search
None
See application file for complete search history.

(56) References Cited

U.S. PATENT DOCUMENTS

| | | | |
|---|---|---|---|
| 5,307,376 A * | 4/1994 | Castelain et al. | 375/260 |
| 6,362,781 B1 * | 3/2002 | Thomas et al. | 342/383 |
| 6,654,429 B1 * | 11/2003 | Li | 375/316 |
| 6,765,969 B1 * | 7/2004 | Vook et al. | 375/259 |
| 7,145,959 B2 * | 12/2006 | Harel et al. | 375/267 |
| 7,151,809 B2 | 12/2006 | Ketchum et al. | |
| 7,680,026 B2 | 3/2010 | Stopler | |
| 2004/0171398 A1 * | 9/2004 | Hanaoka et al. | 455/513 |
| 2004/0196793 A1 * | 10/2004 | Lucidarme et al. | 370/252 |
| 2005/0073949 A1 | 4/2005 | Hayashi | |

(Continued)

FOREIGN PATENT DOCUMENTS

| | | |
|---|---|---|
| EP | 1843498 | 10/2007 |
| JP | 0575568 | 3/1993 |

(Continued)

OTHER PUBLICATIONS

International Search Report and Written Opinion—PCT/US2008/058509, International Search Authority—European Patent Office—Dec. 16, 2008 (071221).

(Continued)

*Primary Examiner* — Shuwang Liu
*Assistant Examiner* — Gina McKie
(74) *Attorney, Agent, or Firm* — John J. Ketchum

(57) ABSTRACT

A method for a wireless communication system is provided. The method includes isolating a set of pilot signals, where the pilot signals are associated with multiple base stations or multiple sectors of a single base station. This includes nulling a subset of the pilot signals to mitigate co-channel interference and to perform channel estimation in accordance with at least one of the pilot signals.

26 Claims, 11 Drawing Sheets

(56) References Cited

U.S. PATENT DOCUMENTS

| | | | |
|---|---|---|---|
| 2005/0174931 A1* | 8/2005 | Krishnamoorthi | 370/208 |
| 2006/0198454 A1* | 9/2006 | Chung et al. | 375/260 |
| 2006/0205437 A1* | 9/2006 | Sung et al. | 455/562.1 |
| 2006/0262715 A1* | 11/2006 | Taniguchi | 370/208 |
| 2007/0183519 A1* | 8/2007 | Dang | 375/260 |
| 2008/0112309 A1 | 5/2008 | Hamaguchi et al. | |
| 2009/0116469 A1* | 5/2009 | Hoffmann et al. | 370/342 |
| 2010/0054371 A1* | 3/2010 | Namgoong et al. | 375/340 |

FOREIGN PATENT DOCUMENTS

| | | |
|---|---|---|
| JP | 2005130485 A | 5/2005 |
| WO | WO2006075732 | 7/2006 |
| WO | WO2006094037 A2 | 9/2006 |
| WO | WO2006138206 A1 | 12/2006 |
| WO | WO2007012635 | 2/2007 |

OTHER PUBLICATIONS

Taiwan Search Report—TW097111087—TIPO—Dec. 16, 2011 (071221TW).

Takaoka S., et al., "Pilot-assisted Adaptive Interpolation Channel Extimation for OFDM Signals," Technical Report of the Institute of Electronics, Information and Communication Engineers, Nov. 13, 2003, vol. 103, No. 456, pp. 51-56, RCS 2003-160.

Lee J., et al., "Performance Improvement of Channel Estimation based on Pilot Structure Variations for Cellular OFDMA", Systems, Vehicular Technology Conference, 2004. VTC2004-Fall., Sep. 29, 2004, vol. 2, pp. 989-993.

* cited by examiner

CHANNEL ESTIMATION WITH EFFECTIVE CO-CHANNEL INTERFERENCE SUPPRESSION

CROSS REFERENCE TO RELATED APPLICATION

This application claims the benefit of U.S. Provisional Patent Application No. 60/908,399, entitled A METHOD AND APPARATUS FOR CHANNEL ESTIMATION WITH EFFECTIVE CO-CHANNEL INTERFERENCE SUPPRESSION, and filed on Mar. 27, 2007, the entirety of which is incorporated herein by reference.

BACKGROUND

I. Field

The following description relates generally to communications systems, and more particularly to performing channel estimations while effectively mitigating co-channel interference.

II. Background

Wireless communication systems are widely deployed to provide various types of communication content such as voice, data, and so forth. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems.

Generally, a wireless multiple-access communication system can concurrently support communication for multiple wireless terminals that communicate with one or more base stations via transmissions on forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels where $N_S \leq \min\{N_T, N_R\}$. Generally, each of the NS independent channels corresponds to a dimension. The MIMO system can provide improved performance (e.g., higher throughput and/or greater reliability) if the additional dimensionalities created by the multiple transmit and receive antennas are utilized.

A MIMO system also supports time division duplex (TDD) and frequency division duplex (FDD) systems. In a TDD system, the forward and reverse link transmissions are on the same frequency region so that the reciprocity principle allows estimation of the forward link channel from the reverse link channel. This enables an access point to extract transmit beam-forming gain on the forward link when multiple antennas are available at the access point.

Wireless systems transmit pilot signals from base stations to receivers in order to facilitate communications. One important aspect that pilot signals are employed for is channel estimation at the respective receivers. In general, pilot signals can be generated from multiple base stations in a given area or from multiple sectors from a given base station. Such signal transmissions from these multiple transmission sources often interfere with each other. Thus, mechanisms have been devised to mitigate such interference. In one case, signals from different base stations or sectors can be encoded on different frequencies to mitigate interference between sources. Unfortunately, the number of frequencies for transmitting pilot signals is limited. Thus, other solutions have evolved. In another case, signals from different base stations or sectors are transmitted as an orthogonal sequence of three vectors, where each vector represents a different base station or sector. Utilizing this scheme, processing for a single sector requires processing all three vectors concurrently in order to cancel out the effects of cross channel interference. Concurrent vector processing unfortunately does not provide the desired detailed channel estimate information for any particular sector or base station since the computation is an amalgam derived from three sectors. Thus, it would be desirable to be able to mitigate interference between differing sectors and stations while being able to analyze a particular sector or station from other sources in order to effectively perform channel estimation.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Systems and methods are provided to enhance the effectiveness of channel estimation by isolating signals associated with a single transmission source and mitigating or eliminating effects from interfering sources. Channel estimation is enhanced by transforming received time domain pilot and other time domain data from multiple sources into the frequency domain. When such signals are in the frequency domain, associated data from all sources is nulled in order to capture, isolate, and discriminate between the respective pilot signals. After isolating the signals, a frequency to time domain transform is performed on the isolated signals. In the time domain, pilot signals associated with the interfering sources is nulled in order to cancel their associated effects, where the remaining pilot signal is subsequently analyzed to perform time domain channel estimation. If desired, the remaining pilot signal can also be transformed back to the frequency domain, where frequency domain channel estimation can be performed. By nulling out extraneous data and interfering pilot channels, accurate channel estimations can be performed on the pilot signal of interest while mitigating the effects of co-channel interference.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

Systems and methods are provided to facilitate channel estimation in the presence of interfering transmission sources. In an aspect, a method for a wireless communication system is provided. The method includes isolating a set of pilot signals, where the pilot signals are associated with multiple base stations or multiple sectors of a single base station. This includes nulling a subset of the pilot signals to mitigate co-channel interference and to perform channel estimation in accordance with at least one of the pilot signals.

Furthermore, various aspects are described herein in connection with a terminal. A terminal can also be referred to as a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g. a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Figure 1:
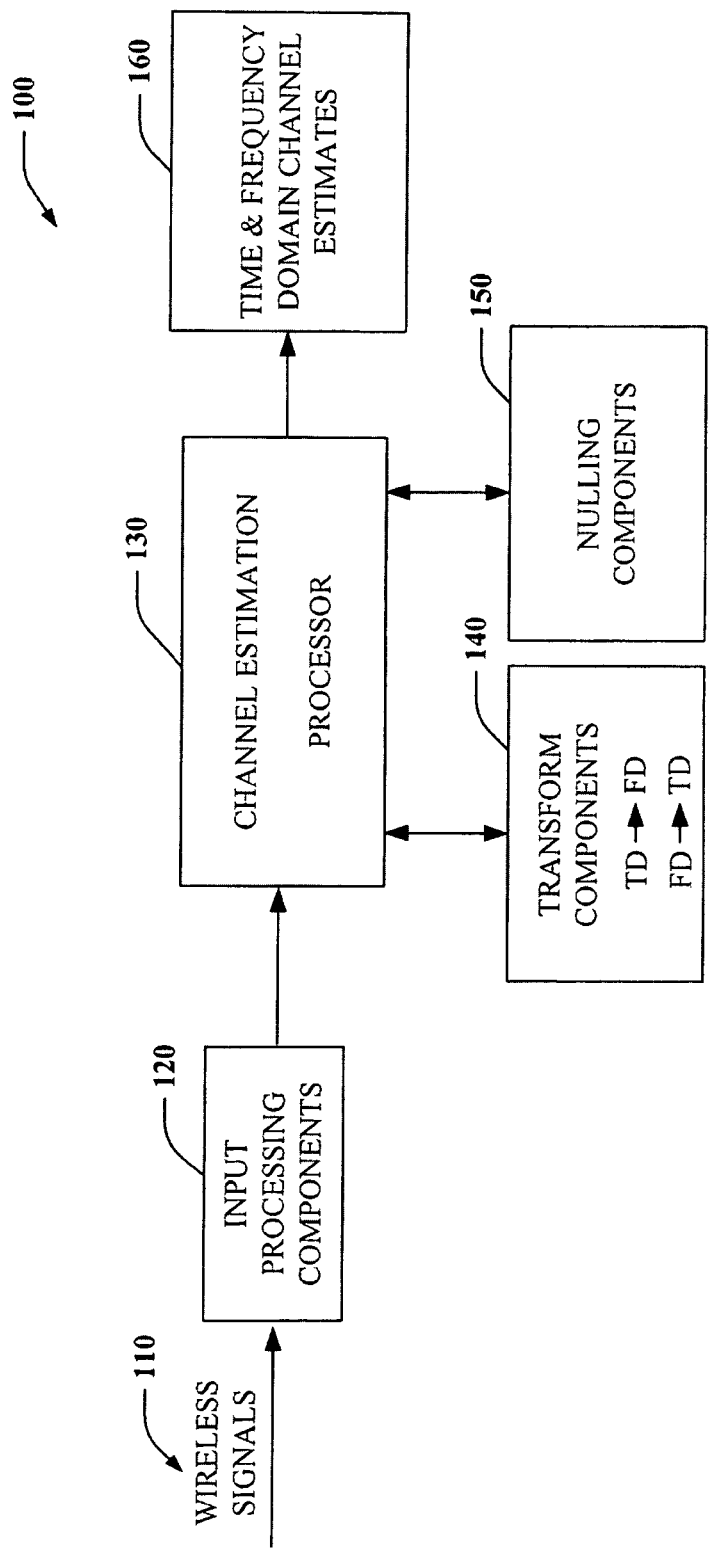
FIG. 1 is a high level block diagram of a system that is provided to illustrate channel estimation in a communications environment.

Referring now to FIG. 1, a system 100 illustrates channel estimation for a communications environment. The system 100 provides effective channel estimation for a multiple-in-signal-out or a multiple-in-multiple-out (MIMO) system (or other type systems described below). Various processing components removes, mitigates, or decreases components of channel interference while enabling focused channel estimations to be performed on a given station or sector. Wireless signals 10 (including symbols and other structures) are initially processed by input processing components 120 and are subsequently processed by a channel estimation processor 130.

The channel estimation processor 130 employs transform components 140 such as Fast Fourier Transforms (FFT) of Inverse Discrete Fourier Transforms (IDFT) to process various signals and stages of channel estimation. Nulling components 150 are provided to mitigate, cancel, or reduce effects of co-channel interference or other data that is not involved in channel estimation. It is noted that as used herein that nulling can include zeroing data, subtracting values, dividing values, or substantially any operation that reduces, minimizes, or mitigates the magnitude or other data value of an interfering source as will be described in more detail below. After extraneous data values or noise sources have been isolated and minimized, time and/or frequency domain channel estimates 160 are determined by the channel estimation processor.

In general, the system 100 enhances the effectiveness of channel estimation 160 by isolating signals associated with a single transmission source (e.g., base station or sector) and mitigating or eliminating effects from interfering sources. Channel estimation 160 is enhanced by transforming received time domain pilot and other time domain data at 140 from multiple sources into the frequency domain. When such signals are in the frequency domain, associated data from all sources is nulled at 150 in order to capture, isolate, and discriminate between the respective pilot signals. After isolating the signals, a frequency to time domain transform is performed on the isolated signals at 140. In the time domain, pilot signals associated with the interfering sources is nulled in order to cancel their associated interference effects, where the remaining pilot signal is subsequently analyzed to perform time domain channel estimation 160.

If desired, the remaining pilot signal can also be transformed back to the frequency domain at 140, where frequency domain channel estimation can be performed at 160. By nulling out extraneous data and interfering pilot channels, accurate channel estimations can be performed on the pilot signal of interest while mitigating the effects of co-channel interference. It is noted that the nulling and transforming acts described herein can be applied to other orthogonal sequences than pilot signals, where other types of signal processing can be performed in addition to the channel estimations previously described. The following provides more detailed discussion into the types of wireless signals 110 that are processed and the relationships between the respective signals.

The pilot signal of Long Tern Evolution (LTE) systems have an inherent structure that enables co-channel pilot interference suppression from other sectors of the same cell. However, a careful channel estimation algorithm design is employed at receiver in order to capitalize this capability. This is particularly hard for a channel with long delay spread. The system 100 can suppress co-channel interference effectively and yet is also able to process long channel delay spread.

In one aspect, first convert a receiver pilot signal in frequency to time domain. This provides a simple a mechanism for suppression of co-channel interference, even with long delay spread. When co-channel interference is suppressed via a simple operation in time domain, the channel estimation is transformed back to frequency domain for further frequency domain processing (e.g., data demodulation, and so forth).

In an aspect, consider three pilots, occupying the same tones and time symbols. Consider a channel estimation in a single symbol. In the symbol carrying the pilot, every $6^{th}$ tone is actually occupied by the pilot and again it is assumed that these will be the same tones for all three pilots. The pilots are spread in the frequency domain with one of the following sequences:

$$[1,1,1], [1,\alpha\alpha^2], [1,\alpha^2,\alpha]$$

where $\alpha$ is a complex $m^{th}$ unit root (m=3 in our case).

Considering that the pilot occupies every $k^{th}$ tone (k=6 in this example), the above is equivalent to multiplying the pilot spectrum by $$1, e^{2\pi j mk}, e^{-2\pi j mk}, \text{ respectively.}$$

Assume the system 100 processes the first pilot and ignores the presence of any other pilots (i.e., no despreading). In this case, one could carry out an FFT of the input signal resulting in $N_{BW}$ tones in-band and then could extract every $k^{th}$ tone, which are occupied by the pilot. Next, carry out an $N_{BW}/k$ point DFT to get the time domain channel response estimate. With ideal time tracking, the time domain estimate would yield the $c_i$ delay tap coefficients for $0 \le i \le L-1$ where $L=N_{BW}/k$.

On can observe that after this processing, the other two pilots would show up at channel tap points beginning at L/m and 2L/m, respectively. With the long delay spread, the pilots would be cyclically wrapped around in addition creating an alias. But, if it is assumed that for each pilot the delay spread is less than L/m, then an ML pilot estimate can be generated for all three pilots very easily:

Generally, one can time window the channel taps so that the time domain estimates $\hat{c}_1, \hat{c}_2, \hat{c}_3$ for the three pilots, before going back to the frequency domain is as follows:

$$\hat{c}_{1,i} = \begin{cases} c_i & 0 \le i \le L/m \\ 0 & \text{otherwise} \end{cases}$$

$$\hat{c}_{2,i} = \begin{cases} c_{i+L/mk} & 0 \le i \le L/m \\ 0 & \text{otherwise} \end{cases}$$

$$\hat{c}_{3,i} = \begin{cases} c_{i+2L/mk} & 0 \le i \le L/m \\ 0 & \text{otherwise} \end{cases}$$

This approach is optimum if the delay spread is known to be less than 1/m times the delay spread corresponding to the original pilot spacing. If this is not the case, then an ML estimate can be given as follows:

$$\hat{c}_{1,i} = \frac{c_i \cdot \sigma_{1,i}^2}{\sigma_{1,i}^2 + \sigma_{2,i-L/mk}^2 + \sigma_{3,i-2L/mk}^2 + \sigma_N^2}$$

$$\hat{c}_{2,i} = \frac{c_{i+L/mk} \cdot \sigma_{2,i}^2}{\sigma_{1,i+L/mk}^2 + \sigma_{2,i}^2 + \sigma_{3,i-L/mk}^2 + \sigma_N^2}$$

$$\hat{c}_{3,i} = \frac{c_{i+2L/mk} \cdot \sigma_{3,i}^2}{\sigma_{1,i+2L/mk}^2 + \sigma_{2,i+L/mk}^2 + \sigma_{3,i}^2 + \sigma_N^2}$$

where $\sigma_{n,i}^2$ is the estimate channel tap power for pilot n at delay i.

$\sigma_{n,i}^2$ could be estimated, for example, as $\sigma_{n,i}^2 = \text{PSD}_{Pilot\_n} \cdot e^{-\lambda_n i}$ where $\lambda_n$ is the decay factor associated with an assumed exponential delay spread profile for sector (pilot) n. It is not efficient to estimate $\lambda_n$ but some a priori stored estimate might suffice. There are alternate methods to estimate $\sigma_{n,i}^2$ as well.

The advantages of the time domain pilot separation method are the following: Simpler implementation, since the extra step of initial despreading is avoided; Potentially optimum performance if suitable estimates are used $\sigma_{n,i}^2$; Since despreading is performed further down the processing chain, more information can be used for optimum time windowing, and since all three pilots can be processed with common initial stages; the pilot separation is simply performed by the time windowing.

It is noted that pilot CDM multiplexing can also be carried out in the time domain, in other words, time domain spreading sequences can be used instead of frequency domain spreading sequences. The equivalent pilot separation method would imply a sync time domain interpolation, or equivalently, frequency domain windowing or weighting. The condition for frequency domain windowing to be the optimum despreading method in this case is the following:

$$\text{Doppler} < \frac{1}{mT_p}$$

where m is again the number of pilots CDM's in the same resource blocks and $T_p$ is the pilot symbol spacing in time. For example, with $T_p=0.5$ ms and m=2, the maximum supported UE velocity is 432 km/h in the 2.5 GHz band.

With more complex assumptions on the Doppler power spectrum in frequency, there can be better channel estimators developed but this is not a very practical scenario. In any case, if more than two signals need to be orthogonalized in the time domain, then it is generally better to use DFT unitary transforms rather than Walsh spreading. By using DFT, the ML methods are better facilitated.

A simplified pilot despreading approach was described, which is convenient to use in the case of frequency domain Code Division Multiplexing (CDM) processing. The proposed method carries out the despreading as part of the time domain windowing/thresholding portion of the channel estimation.

It is noted that the system 100 can be employed with an access terminal or mobile device, and can be, for instance, a module such as an SD card, a network card, a wireless network card, a computer (including laptops, desktops, personal digital assistants PDAs), mobile phones, smart phones, or any other suitable terminal that can be utilized to access a network. The terminal accesses the network by way of an access component (not shown). In one example, a connection between the terminal and the access components may be wireless in nature, in which access components may be the base station and the mobile device is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Access components can be an access node associated with a wired network or a wireless network. To that end, access components can be, for instance, a router, a switch, or the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

Figure 2:
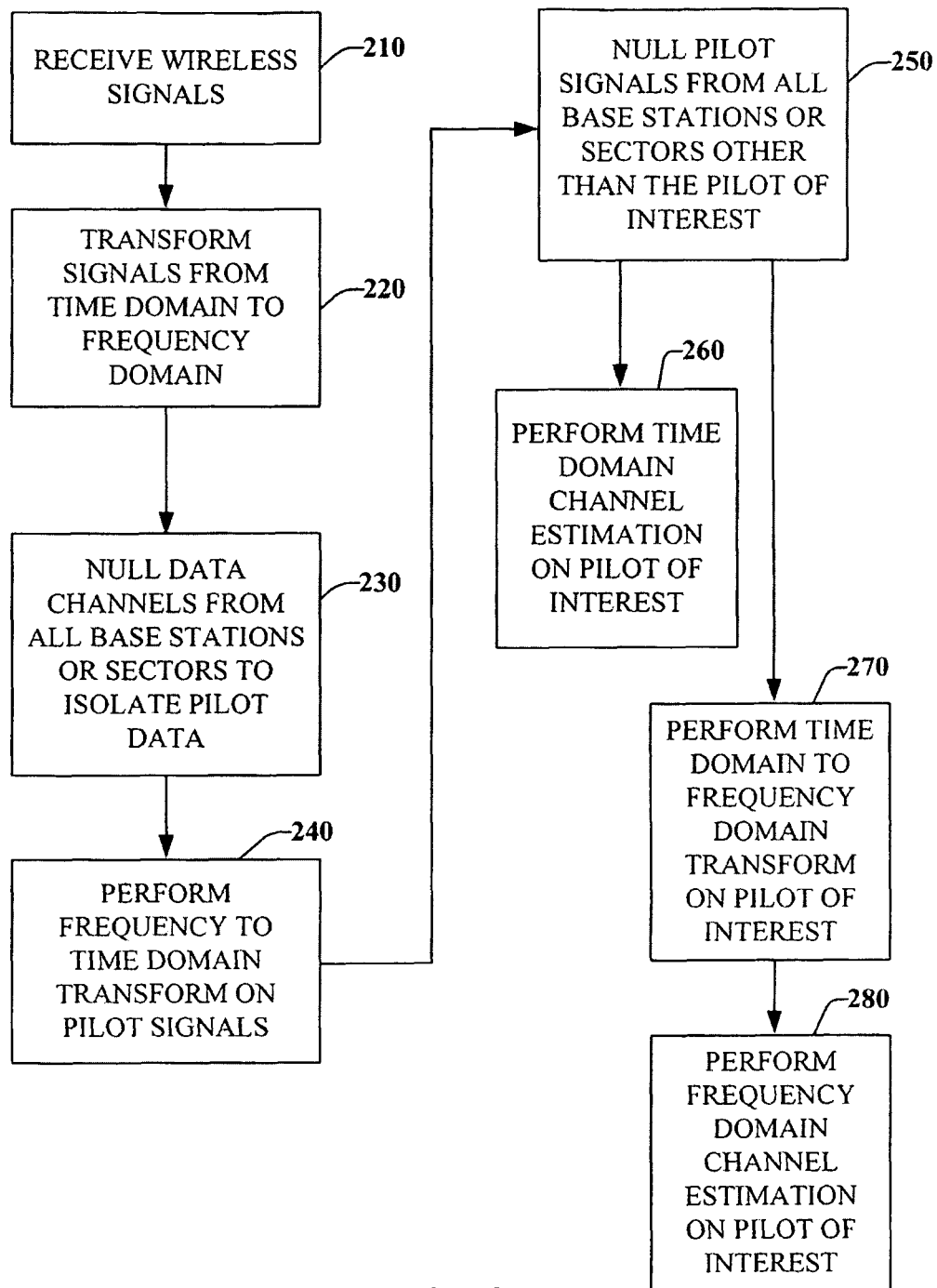
FIG. 2 is a high level flow diagram of a channel estimation methodology.

Referring now to FIG. 2, a channel estimation methodology 200 is illustrated. While, for purposes of simplicity of explanation, the methodology (and other methodologies described herein) is shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to 210 of process 200, wireless signals are received. The signals can be from multiple base stations or multiple sectors of the same base stations. At 220, the received signals are transformed from the time domain to the frequency domain. This will enable data to be isolated from pilot information which is employed to perform channel estimation. At 230, all data channels for signals received from all the respective base station is nulled or zeroed out. What remains are the multi-path remnants of the transmitted pilots for each base station. The time domain representation of the multi-path components is shown in FIG. 3 at 300 where just the pilot signals and their respective multi-paths remain after zeroing and are shown for three base stations A, B, and C, respectively.

Figure 3:
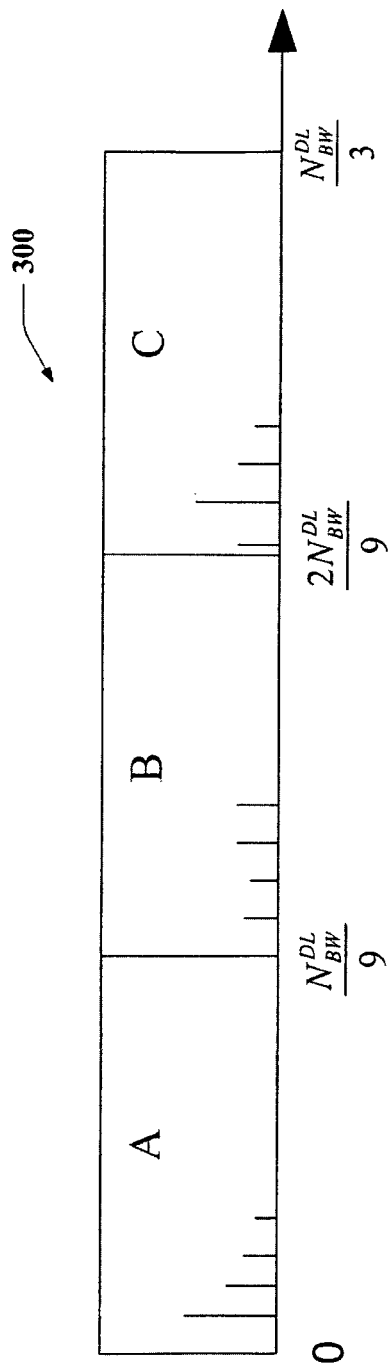
FIG. 3 is an example diagram of processed pilot tones for three base stations or sectors.

Proceeding back to FIG. 2 and 240, the pilot signals of FIG. 3 are transformed from the frequency domain into the time domain. At 250, the pilot signals for two of the base stations are nulled or zeroed. In the example shown in FIG. 3, pilot signals for base station B and C are nulled leaving pilot data base station A to perform channel estimation. At 260, time domain channel estimation is performed based on the remaining pilot data from 250. At 270, another time to frequency domain conversion can occur on the remaining pilot signal. After the conversion, frequency domain channel estimation can be performed at 280.

FIGS. 4-8 illustrate example circuits to perform channel estimation in accordance with the concepts described herein. It is to be appreciated that such circuits are not the only manner in which to perform channel estimation. Generally any components that performs pilot signal isolation via time and frequency domain transforms and employs subsequent data or other signal nulling is within the scope of the embodiments described herein.

Figure 4:
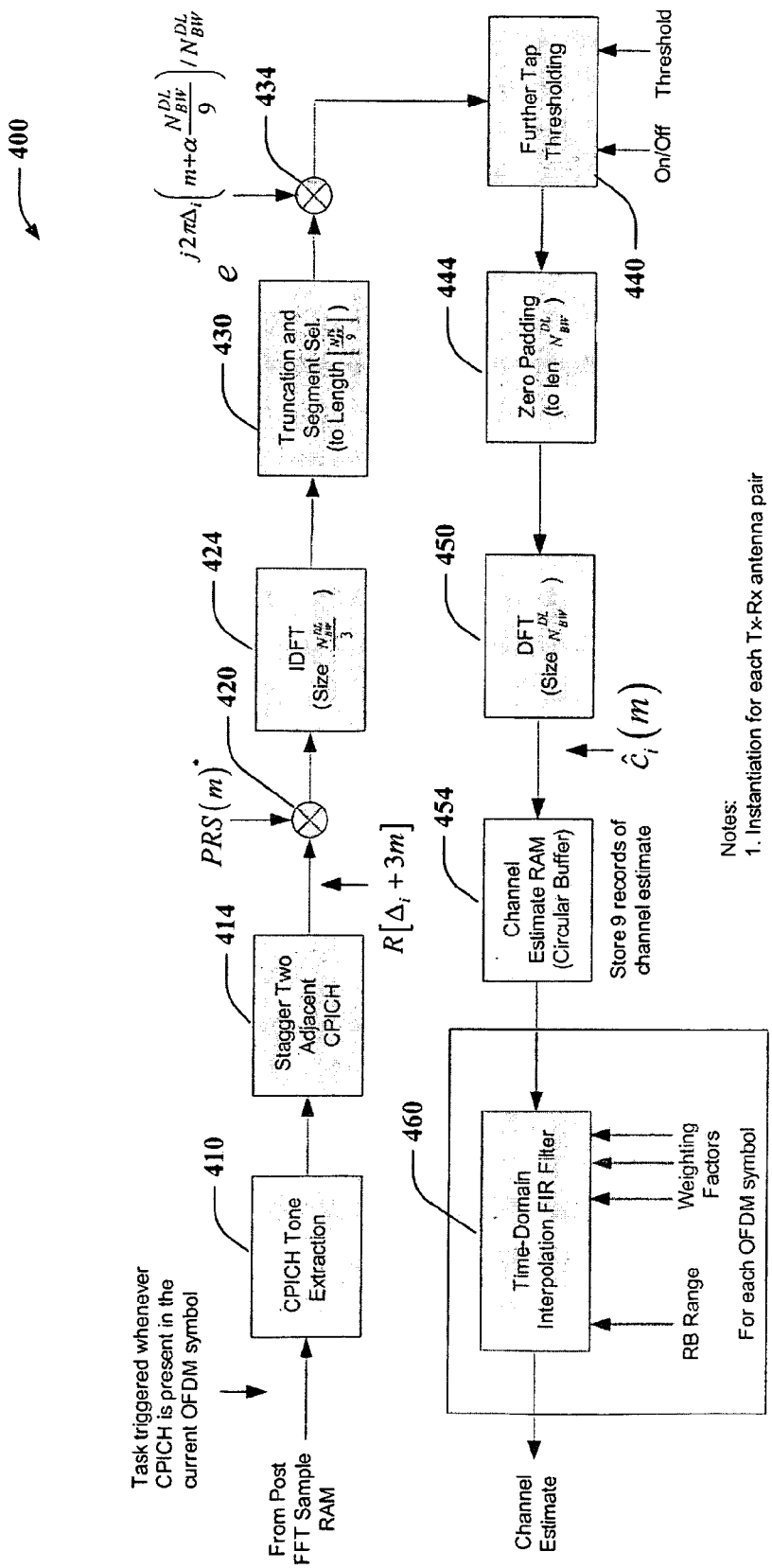
FIGS. 4-7 illustrate exemplary circuit diagrams to perform channel estimation.

Referring to FIG. 4, an example circuit 400 is illustrated to perform channel estimation. A received sample is processed via a tone extractor 410 that feeds output to a stagger component 414. The stagger component adds or otherwise combines pilot tones occupying different parts of the frequency spectrum in different OFDM symbols. Output from the stagger circuit 414 is combined with the pseudo-random pilot scrambling sequence used by the base station or other signals at 420, where an IDFT is performed at 424. Output from the IDFT 424 is truncated at 430 and combined with other phase information at 434. The other phase information may depend on the base station specific pilot tone offset in the frequency domain. Output from 434 is fed to a tap thresholding component 440 which drives a zero padding component 444. Output from the zero padding component 444 is fed to a DFT 450 which subsequently drives a channel estimate buffer 454 and a time domain interpolation filter 460 which generates a channel estimation.

Figure 5:
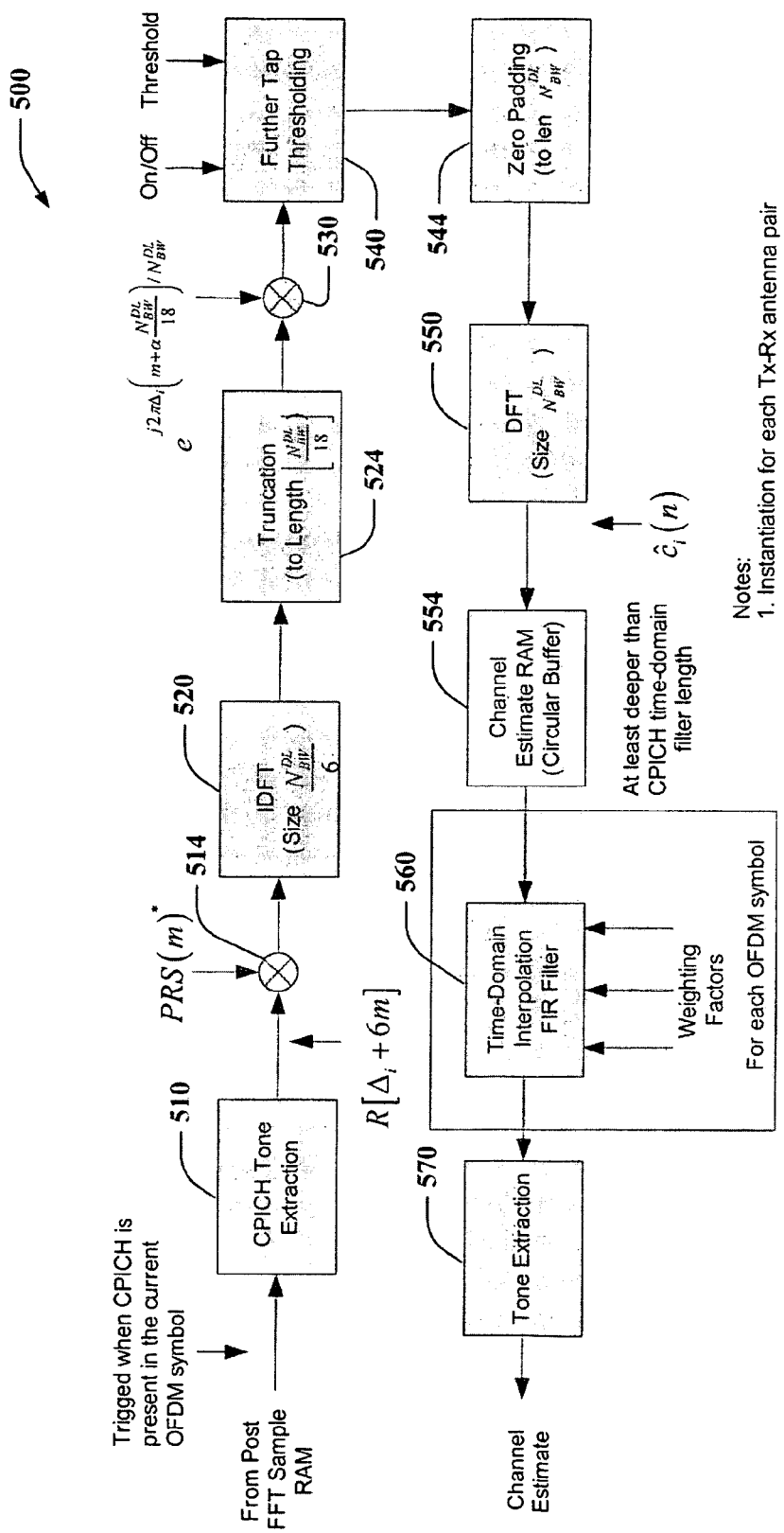

Referring now to FIG. 5, an example circuit 500 is illustrated to perform channel estimation. Inputs samples are processed by a tone extractor 510 that combines output with the pseudo-random pilot scrambling sequence used by the base station or other signals at 514 which is than fed to an IDFT 520. Output from the IDFT 520 is truncated at 524 and combined with other phase information at 530. The other phase information may depend on the base station specific pilot tone offset in the frequency domain. Output from 530 is fed to a tap thresholding component at 540 which is fed to a zero padding component 544. Output from 544 is transformed via a DFT at 550 and fed to a channel estimate buffer which is processed by a time domain interpolation filter 560. Output from the filter 560 is fed to a tone extractor 570 where a channel estimation is then generated.

Figure 6:
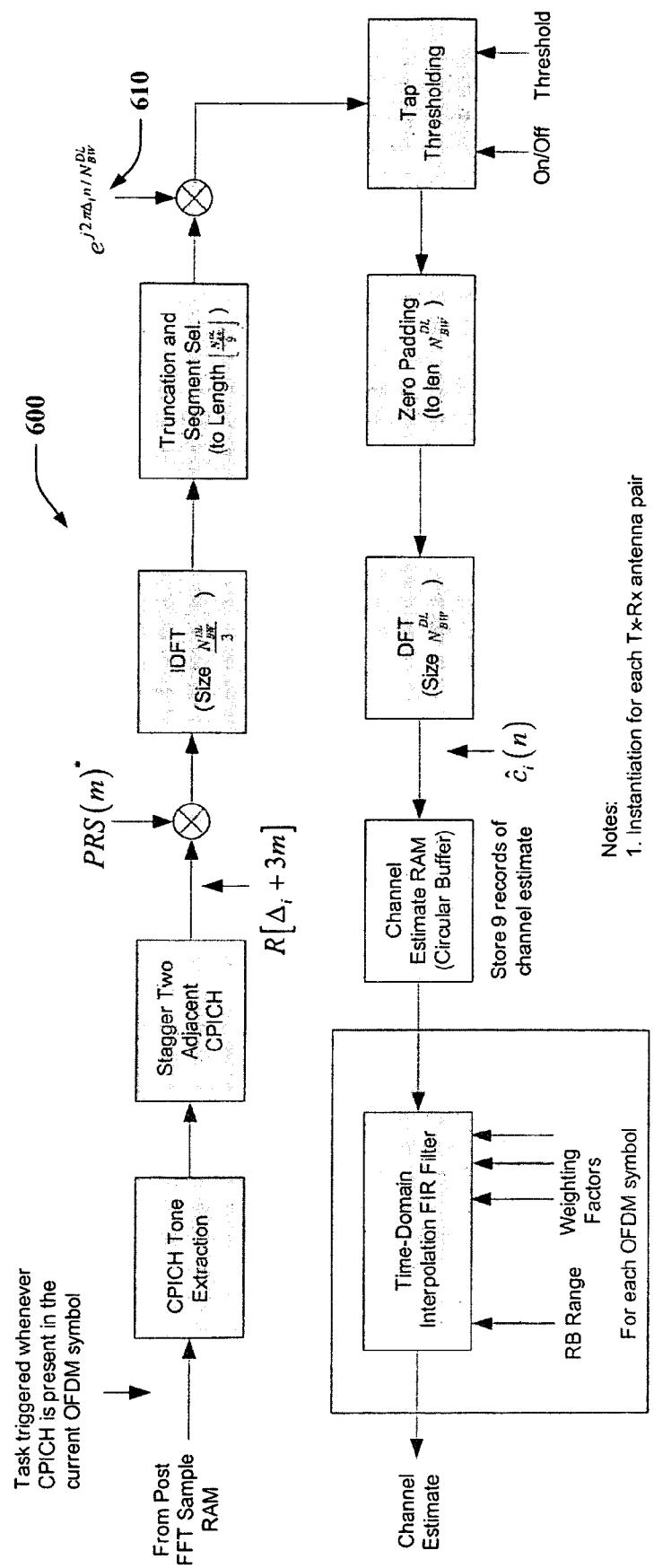

Turning to FIG. 6, an example circuit 600 is illustrated to perform channel estimation. For the purposes of brevity, the circuit 600 is not described as it is substantially the same as the circuit described in FIG. 4. It is noted however that phasor signals that are summed at point 610 are different from that shown at a similar point (434) in FIG. 4.

Figure 7:
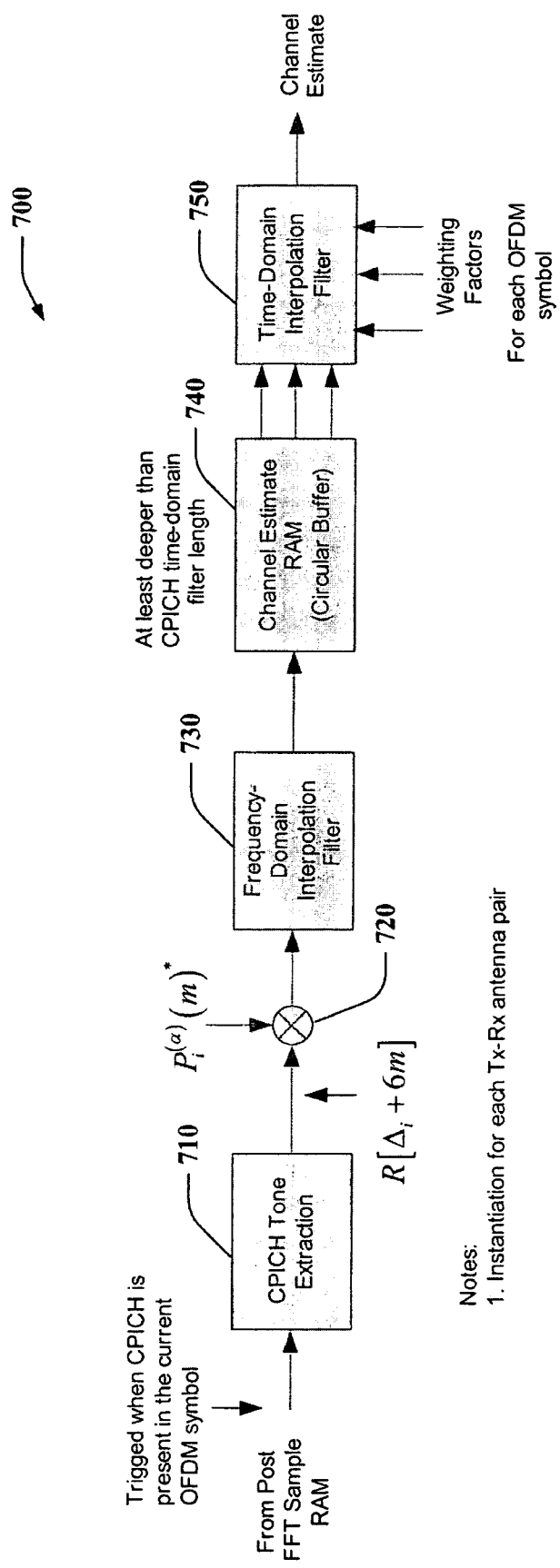

Turning now to FIG. 7, an example circuit 700 is illustrated to perform channel estimation. An input sample is extracted at 710 and combined with the pseudo-random pilot scrambling sequence used by the base station or other signals at 720. Output 720 is applied to a frequency domain filter 730 which feeds a channel estimate buffer 740. Output from the buffer 740 drives a time domain interpolation filter 750 that generates a channel estimate.

Figure 8:
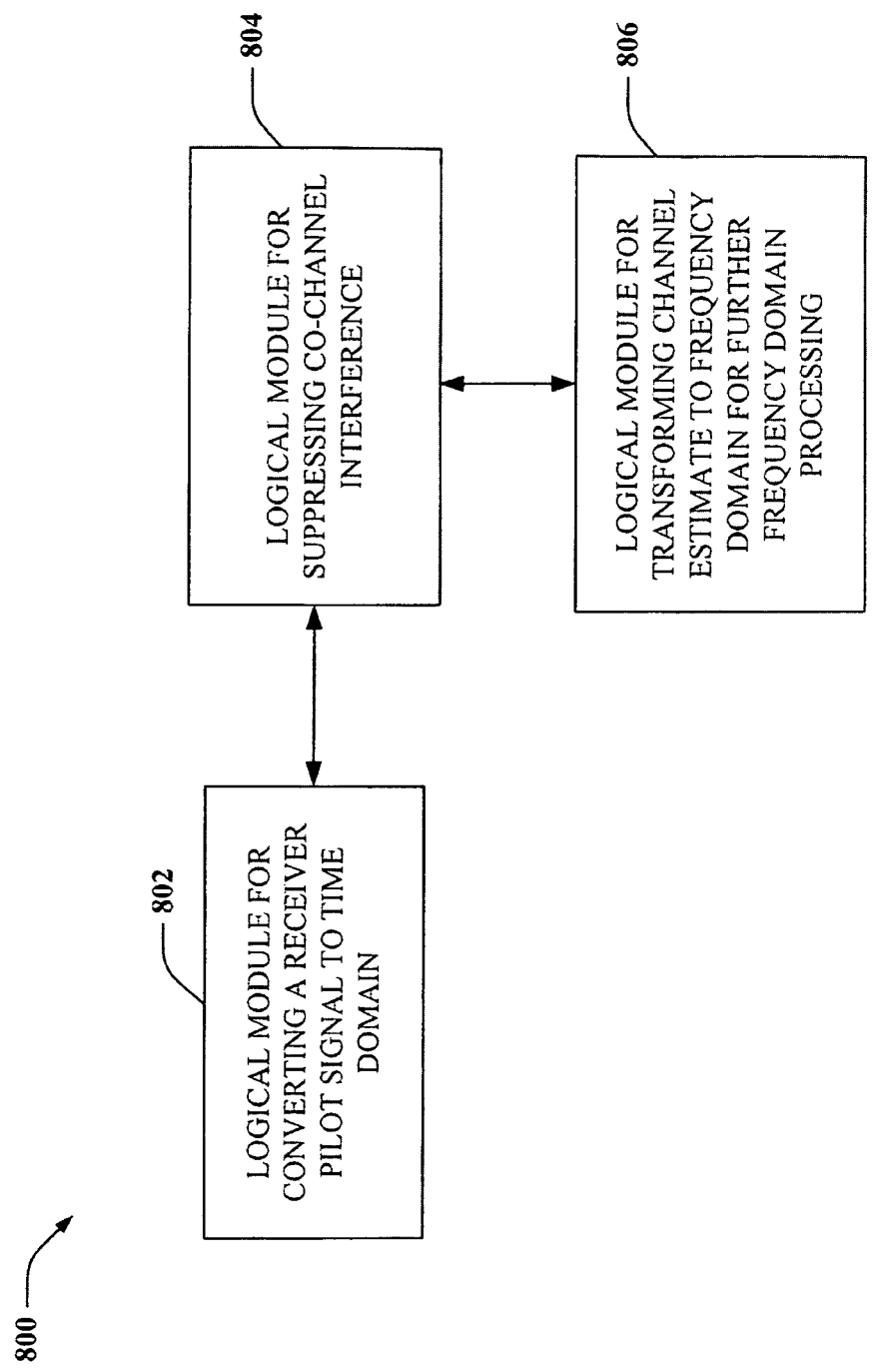
FIG. 8 illustrates an example logical module for channel estimation.

Turning now to FIG. 8, a system is provided that relates to channel estimation. The systems are represented as a series of interrelated functional blocks, which can represent functions implemented by a processor, software, hardware, firmware, or any suitable combination thereof.

A system 800 is provided that facilitates wireless communications. The system 800 includes a logical module 802 means for converting a receiver pilot signal to time domain and a logical module 804 for suppressing co-channel interference. The system 800 also includes a logical module 806 for transforming channel estimate to frequency domain for further frequency domain processing.

Figure 9:
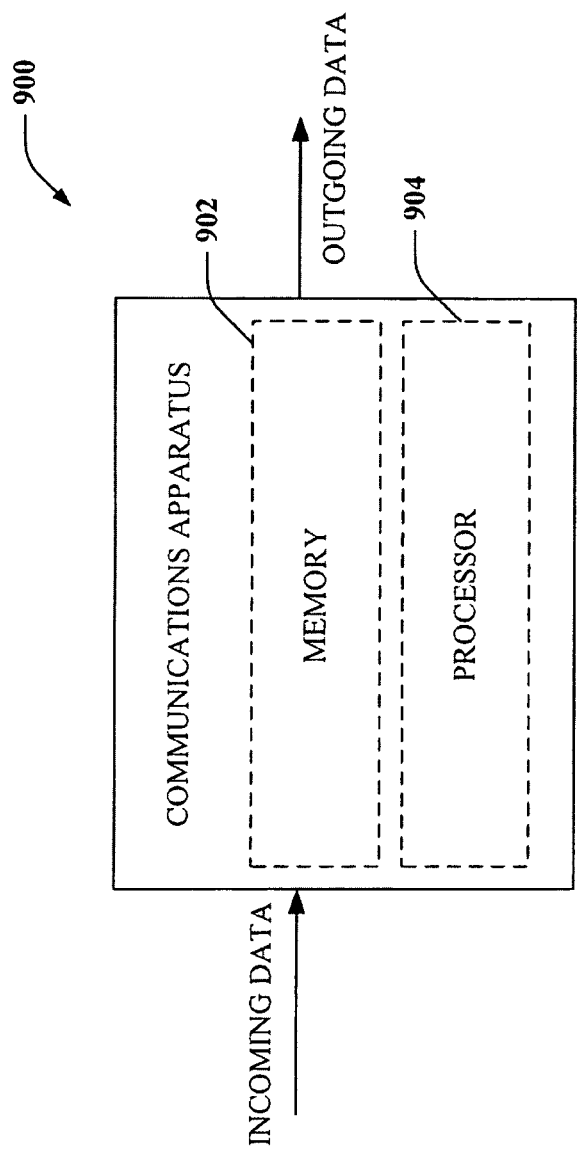
FIG. 9 illustrates an example communications apparatus that employs channel estimation.

FIG. 9 illustrates a communications apparatus 900 that can be a wireless communications apparatus, for instance, such as a wireless terminal. Additionally or alternatively, communications apparatus 900 can be resident within a wired network. Communications apparatus 900 can include memory 902 that can retain instructions for determining a channel estimation in a wireless communications terminal. Additionally, communications apparatus 900 may include a processor 904 that can execute instructions within memory 902 and/or instructions received from another network device, wherein the instructions can relate to configuring or operating the communications apparatus 900 or a related communications apparatus.

Figure 10:
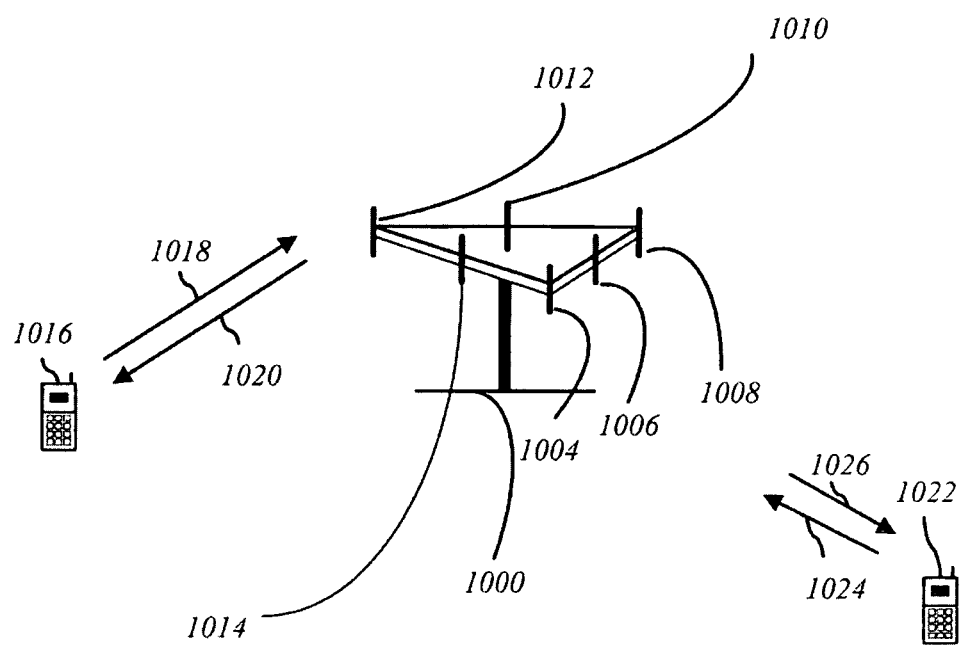
FIGS. 10 and 11 illustrate example communications systems that can be employed with channel estimation components.

Referring now to FIG. 10, a multiple access wireless communication system according to one aspect is illustrated. An access point 1000 (AP) includes multiple antenna groups, one including 1004 and 1006, another including 1008 and 1010, and an additional including 1012 and 1014. In FIG. 10, only two antennas are shown for each antenna group, however, more or fewer antennas may be utilized for each antenna group. Access terminal 1016 (AT) is in communication with antennas 1012 and 1014, where antennas 1012 and 1014 transmit information to access terminal 1016 over forward link 1020 and receive information from access terminal 1016 over reverse link 1018. Access terminal 1022 is in communication with antennas 1006 and 1008, where antennas 1006 and 1008 transmit information to access terminal 1022 over forward link 1026 and receive information from access terminal 1022 over reverse link 1024. In a FDD system, communication links 1018, 1020, 1024 and 1026 may use different frequency for communication. For example, forward link 1020 may use a different frequency then that used by reverse link 1018.

Each group of antennas and/or the area in which they are designed to communicate is often referred to as a sector of the access point. Antenna groups each are designed to communicate to access terminals in a sector, of the areas covered by access point 1000. In communication over forward links 1020 and 1026, the transmitting antennas of access point 1000 may utilize beam-forming in order to improve the signal-to-noise ratio of forward links for the different access terminals 1016 and 1024. Also, an access point using beam-forming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a base station, a Node B, or some other terminology. An access terminal may also be called an access terminal, user equipment (UE), a wireless communication device, terminal, access terminal, mobile station or some other terminology.

Figure 11:
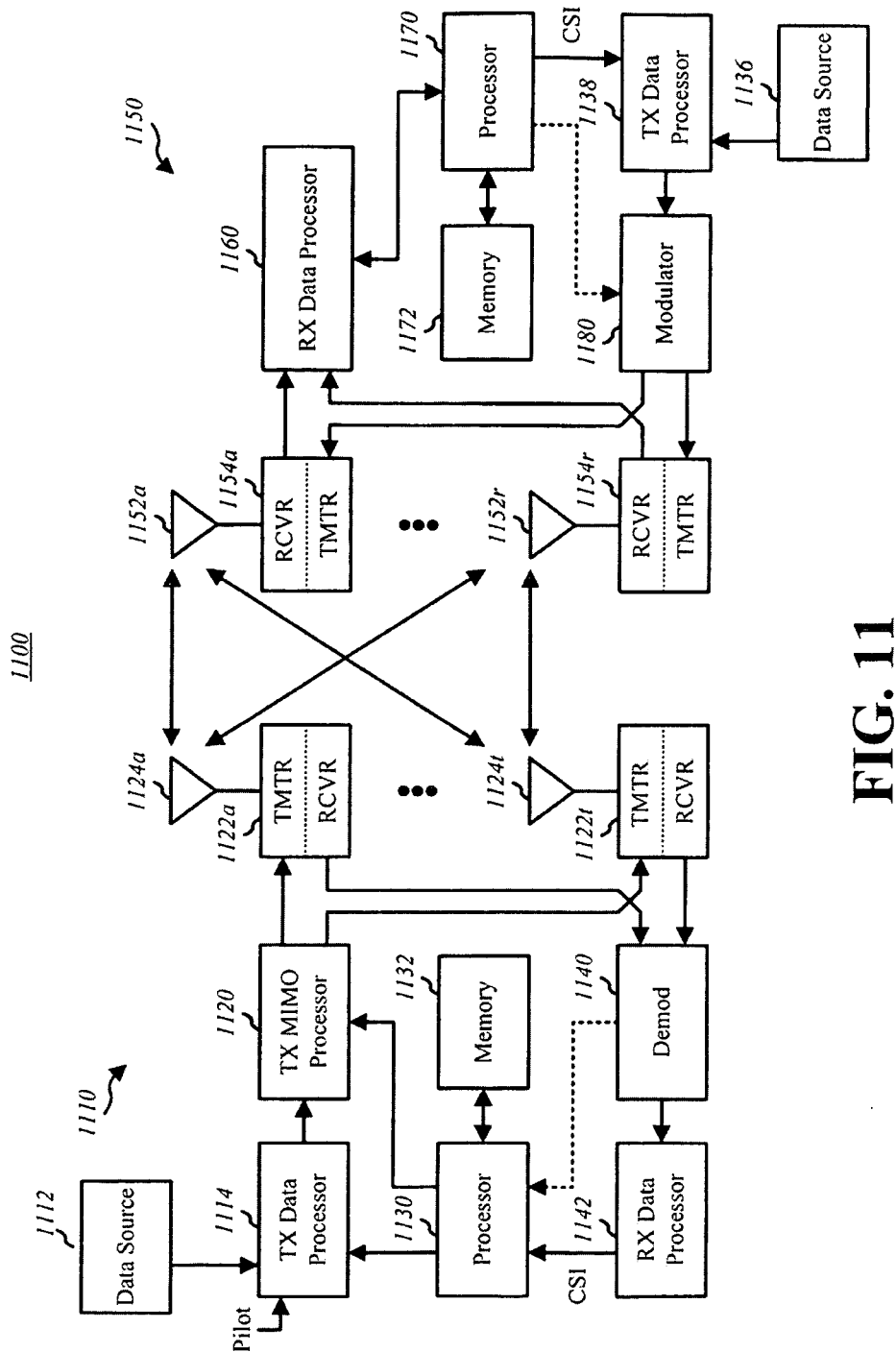

Referring to FIG. 11, a system 1100 illustrates a transmitter system 210 (also known as the access point) and a receiver system 1150 (also known as access terminal) in a MIMO system 1100. At the transmitter system 1110, traffic data for a number of data streams is provided from a data source 1112 to a transmit (TX) data processor 1114. Each data stream is transmitted over a respective transmit antenna. TX data processor 1114 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1130.

The modulation symbols for all data streams are then provided to a TX MIMO processor 1120, which may further process the modulation symbols (e.g., for OFDM). TX MIMO processor 1120 then provides NT modulation symbol streams to NT transmitters (TMTR) 1122a through 1122t. In certain embodiments, TX MIMO processor 1120 applies beam-forming weights to the symbols of the data streams and to the antenna from which the symbol is being transmitted.

Each transmitter 1122 receives and processes a respective symbol stream to provide one or more analog signals, and further conditions (e.g., amplifies, filters, and up-converts) the analog signals to provide a modulated signal suitable for transmission over the MIMO channel. NT modulated signals from transmitters 1122a through 1122t are then transmitted from NT antennas 1124a through 1124t, respectively.

At receiver system 1150, the transmitted modulated signals are received by NR antennas 1152a through 1152r and the received signal from each antenna 1152 is provided to a respective receiver (RCVR) 1154a through 1154r. Each receiver 1154 conditions (e.g., filters, amplifies, and down-converts) a respective received signal, digitizes the conditioned signal to provide samples, and further processes the samples to provide a corresponding "received" symbol stream.

An RX data processor 1160 then receives and processes the NR received symbol streams from NR receivers 1154 based on a particular receiver processing technique to provide NT "detected" symbol streams. The RX data processor 1160 then demodulates, de-interleaves, and decodes each detected symbol stream to recover the traffic data for the data stream. The processing by RX data processor 1160 is complementary to that performed by TX MIMO processor 1120 and TX data processor 1114 at transmitter system 1110.

A processor 1170 periodically determines which pre-coding matrix to use (discussed below). Processor 1170 formulates a reverse link message comprising a matrix index portion and a rank value portion. The reverse link message may comprise various types of information regarding the communication link and/or the received data stream. The reverse link message is then processed by a TX data processor 1138, which also receives traffic data for a number of data streams from a data source 1136, modulated by a modulator 1180, conditioned by transmitters 1154a through 1154r, and transmitted back to transmitter system 1110.

At transmitter system 1110, the modulated signals from receiver system 1150 are received by antennas 1124, conditioned by receivers 1122, demodulated by a demodulator 1140, and processed by a RX data processor 1142 to extract the reserve link message transmitted by the receiver system 1150. Processor 1130 then determines which pre-coding matrix to use for determining the beam-forming weights then processes the extracted message.

In an aspect, logical channels are classified into Control Channels and Traffic Channels. Logical Control Channels comprises Broadcast Control Channel (BCCH) which is DL channel for broadcasting system control information. Paging Control Channel (PCCH) which is DL channel that transfers paging information. Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. Logical Traffic Channels comprise a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

Transport Channels are classified into DL and UL. DL Transport Channels comprises a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprises a Random Access Channel (RACH), a Request Channel (REQCH), an Uplink Shared Data Channel (UL-SDCH) and plurality of PHY channels. The PHY channels comprise a set of DL channels and UL channels.

The DL PHY channels comprises:
Common Pilot Channel (CPICH)
Synchronization Channel (SCH)

Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprises:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In an aspect, a channel structure is provided that preserves low PAR (at any given time, the channel is contiguous or uniformly spaced in frequency) properties of a single carrier waveform.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims such term is intended to be inclusive in a manner similar to the term "comprising" as "comprising" is interpreted when employed as a transitional word in a claim.

What is claimed is:

1. A method, comprising:
    transforming received signals from a time domain to a frequency domain to generate a plurality of pilot signals and associated data in the frequency domain;
    nulling the associated data to isolate the plurality of pilot signals;
    converting the isolated plurality of pilot signals to the time domain;
    isolating a particular pilot signal in the time domain by zeroing each pilot signal of the isolated plurality of pilot signals except the particular pilot signal; and
    performing channel estimation using the particular pilot signal.

2. The method of claim 1, wherein each pilot signal of the plurality of pilot signals is associated with a different base station of multiple base stations.

3. The method of claim 1, further comprising: after isolating the particular pilot signal:
    analyzing the particular pilot signal from a particular base station or from a particular sector of a base station; and.

4. The method of claim 1, wherein performing the channel estimation comprises performing a time domain channel estimation or performing a frequency domain channel estimation.

5. The method of claim 1, further comprising transforming the particular pilot signal from the time domain to the frequency domain.

6. The method of claim 1, wherein the plurality of pilot signals is associated with three base stations.

7. The method of claim 1, wherein the plurality of pilot signals is associated with three sectors of a single base station.

8. The method of claim 1, wherein performing the channel estimation includes performing a tone extraction on the particular pilot signal or performing an inverse discrete Fourier transform on the particular pilot signal.

9. The method of claim 1, wherein performing the channel estimation includes performing a discrete Fourier transform on the particular pilot signal, performing a zero padding operation on the particular pilot signal, or performing a time domain interpolation filter operation on the particular pilot signal.

10. A communications apparatus comprising:
    a processor; and
    a memory storing instructions executable by the processor to perform operations comprising:
    transforming received signals from a time domain to a frequency domain to generate a plurality of pilot signals and associated data in the frequency domain;
    nulling the associated data to isolate the plurality of pilot signals;
    converting the isolated plurality of pilot signals to the time domain;
    isolating a particular pilot signal in the time domain by zeroing each pilot signal of the isolated plurality of pilot signals except the particular pilot signal; and
    performing channel estimation using the particular pilot signal.

11. The communications apparatus of claim 10, wherein performing the channel estimation comprises performing a time domain channel estimation or performing a frequency domain channel estimation.

12. The communications apparatus of claim 10, wherein the processor comprises a tone extraction circuit to facilitate the channel estimation.

13. The communications apparatus of claim 10, wherein the processor comprises a zero padding circuit to facilitate the channel estimation.

14. The communications apparatus of claim 10, wherein the processor comprises a time domain interpolation filter to facilitate the channel estimation.

15. The communications apparatus of claim 10, wherein the processor comprises a thresholding component to facilitate the channel estimation.

16. A communications apparatus comprising:
    means for transforming received signals from a time domain to a frequency domain to generate a plurality of pilot signals and associated data in the frequency domain;
    means for nulling the associated data to isolate the plurality of pilot signals;
    means for converting the isolated plurality of pilot signals to the time domain;
    means for isolating a particular pilot signal in the time domain by zeroing each pilot signal of the isolated plurality of pilot signals except the particular pilot signal;
    means for generating a channel estimate using the particular pilot signal; and
    means for transforming the channel estimate to the frequency domain for frequency domain processing.

17. The apparatus of claim 16, further comprising:
    means for analyzing the particular pilot signal from a particular base station or from a particular sector of a base station after isolating the particular pilot signal in the time domain.

18. The apparatus of claim 16, wherein zeroing each pilot signal of the isolated plurality of pilot signals except the particular pilot signal includes nulling each pilot signal of the isolated plurality of pilot signals in the time domain except the particular pilot signal.

19. The apparatus 16, wherein each pilot signal of the plurality of pilot signals is associated with a different base station of multiple base stations.

20. A non-transitory computer-readable medium comprising instructions that, when executed by a processor, cause the processor to,
   null data channels associated with orthogonal base stations or sectors to isolate a plurality of pilot tones
   isolate a single pilot tone from among the plurality of isolated pilot tones in a time domain by zeroing each pilot tone of the isolated plurality of pilot tones except the single pilot tone, wherein a subset of the isolated plurality of pilot tones is associated with a first transmission source and a second transmission source, and wherein the single pilot tone is associated with a third transmission source; and
   perform a channel estimation using the single pilot tone.

21. The non-transitory computer-readable medium of claim 20, wherein the channel estimation includes at least one of a time domain channel estimation or a frequency domain channel estimation.

22. The non-transitory computer-readable medium of claim 20, further comprising instructions that, when executed by the processor, cause the processor to transform the subset of the plurality of pilot tones to a frequency domain.

23. An apparatus comprising:
   a processor; and
   a memory storing instructions executable by the processor to perform operations comprising:
      nulling data channels associated with orthogonal base stations or sectors to isolate a plurality of pilot signals;
      isolating a particular pilot signal of the isolated plurality of pilot signals in a time domain by zeroing each pilot signal of the isolated plurality of pilot signals except the particular pilot signal;
      performing channel estimation using the the particular pilot signal.

24. The apparatus of claim 23, wherein the operations further comprise transforming received signals from the orthogonal base stations or sectors to generate the plurality of pilot signals and data channels.

25. The apparatus of claim 24, wherein transforming the received signals includes a time domain to frequency domain transform.

26. The apparatus of claim 23, wherein the operations further comprise transforming the plurality of pilot signals from a frequency domain to the time domain.

* * * * *